United States Patent [19]

Schwartzberg

[11] 4,061,385
[45] Dec. 6, 1977

[54] IMPACT ABSORBING BUMPER

[76] Inventor: Abraham Schwartzberg, 2931 Sunrise Lakes Drive East Sunrise,, Fort Lauderdale, Fla. 33322

[21] Appl. No.: 738,226

[22] Filed: Nov. 1, 1976

Related U.S. Application Data

[63] Continuation-in-part of Ser. No. 627,234, Nov. 17, 1975, abandoned.

[51] Int. Cl.² .............................................. B60R 19/10
[52] U.S. Cl. ..................................................... 293/71 P
[58] Field of Search ...................... 293/71 R, 71 P, 70, 293/73; 114/219

[56] References Cited

U.S. PATENT DOCUMENTS

| 2,614,877 | 10/1952 | Benian | 293/71 R |
| 2,620,216 | 12/1952 | Brand | 293/67 |
| 2,873,993 | 2/1959 | Sauke | 293/71 R X |
| 3,146,014 | 8/1964 | Kroell | 293/71 R X |
| 3,237,964 | 3/1966 | Doyle | 293/71 R X |
| 3,418,815 | 12/1968 | Kumazawa | 293/71 R |
| 3,473,836 | 10/1969 | Halter | 293/65 X |
| 3,588,159 | 6/1971 | Duckett et al. | 293/71 R X |
| 3,610,609 | 10/1971 | Sobel | 293/70 X |
| 3,695,665 | 10/1972 | Matsuura | 293/71 R X |
| 3,879,075 | 4/1975 | Hale | 293/71 R |

FOREIGN PATENT DOCUMENTS

| 2,303,778 | 1/1973 | Germany | 293/71 P |
| 412,949 | 3/1946 | Italy | 293/71 P |

Primary Examiner—Barry L. Kelmachter
Attorney, Agent, or Firm—Salvatore G. Militana

[57] ABSTRACT

An impact absorbing bumper consisting of a housing and resilient impact receiving member having an inner portion slidably mounted in the housing and an outer portion extending through an opening in the housing and engaging an inner tube containing air under pressure positioned in the housing. Upon impact the inner portion acts as a piston against air under pressure in the inner tube to absorb most of the impact force, while the inherent resiliency of the impact receiving member absorbs part of the impact force as well as upon becoming distorted by the impact, increased resistance is offered at the opening to the sliding movement of the impact receiving member.

2 Claims, 7 Drawing Figures

IMPACT ABSORBING BUMPER

CROSS REFERENCE TO A RELATED APPLICATION

This application is a continuation in part of U.S. patent application Ser. No. 627,234, filed on Nov. 17, 1975, For Impact Absorbing Automobile Bumper (now abandoned).

BACKGROUND OF THE INVENTION

1. Field Of The Invention

The present invention is directed to impact absorbing bumpers.

2. Description Of The Prior Art.

The conventional bumpers for automobiles, trucks, platforms, docks, etc. are not efficient as impact absorbing devices but serve mostly as a barrier that receive the shock or impact force and distribute the forces to other members to which they are attached. Most conventional bumpers are made of resilient material that due to its resilient nature will absorb some of the impact force. Some utilize resilient material that encapsulate air that serves to absorb some of the impact force applied thereagainst. Those conventional bumpers that are not of themselves resilient, provide springs to absorb some of the impact force.

The present invention contemplate providing a bumper of maximum efficiency that absorbs the greatest portion of the impact force possible.

SUMMARY OF THE INVENTION

Therefore a principal object of the present invention it to provide a bumper that is a truly impact absorbing device adapted to be utilized in automobiles, trucks, trailers, docks, landing platforms, etc.

Another object of the present invention is to provide an impact absorbing bumper whose impact receiving member is resilient for absorbing a portion of the impact force.

A further object of the present invention is to provide an impact absorbing bumper having a resilient receiving member that also operates as a piston to compress air contained in an inner tube by the impact force being applied thereon, whereby said force is substantially totally absorbed thereby.

A still further object of the present invention is to provide a piston type impact absorbing bumper described as above whereby a force applied on the resilient receiving member causes a distortion of the member and an increased resistance to the sliding movement thereof, thereby effecting an absorption of additional part of the force.

With these and other objects in view, the invention will be best understood from a consideration of the following detailed description taken in connection with the accompanying drawing forming a part of this specification, with the understanding, however, that the invention is not confined to any strict conformity with the showing of the drawing but may be changed or modified so long as such changes or modifications mark no material departure from the salient features of the invention as expressed in the appended claims.

DESCRIPTION OF THE PREFERRED EMBODIMENT

Figure 1:
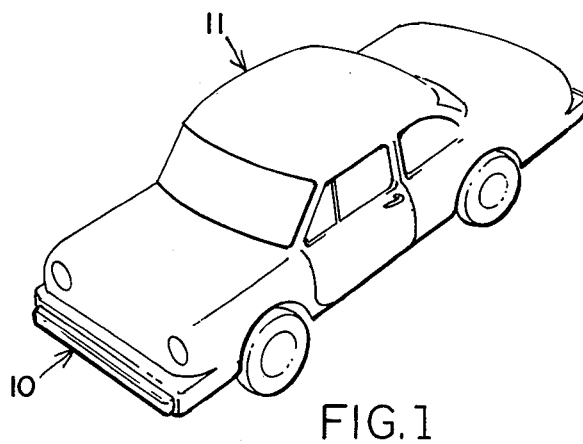
FIG. 1 is a perspective view of an automobile on which my impact absorbing bumpers are mounted at the front and rear thereof.
Figure 2:
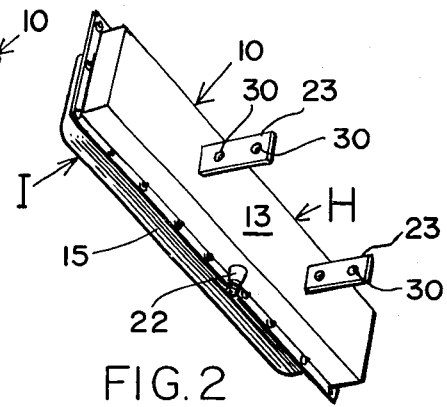
FIG. 2 is a perspective view of my impact absorbing bumper as seen prior to mounting on the automobile.
Figure 3:
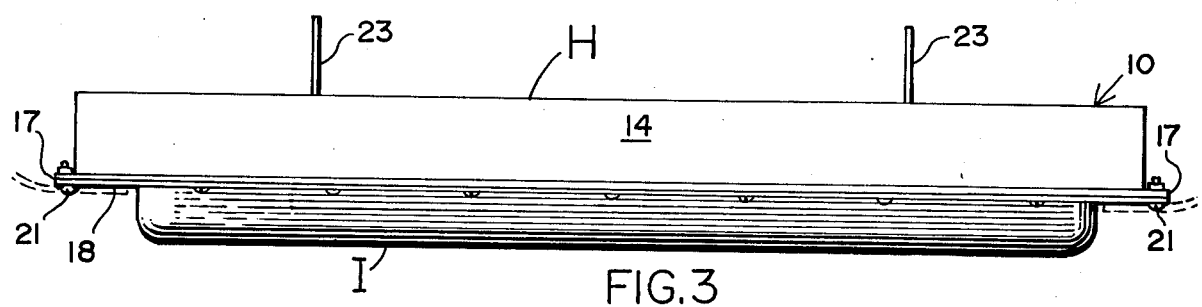
FIG. 3 is a top plan view.
Figure 4:
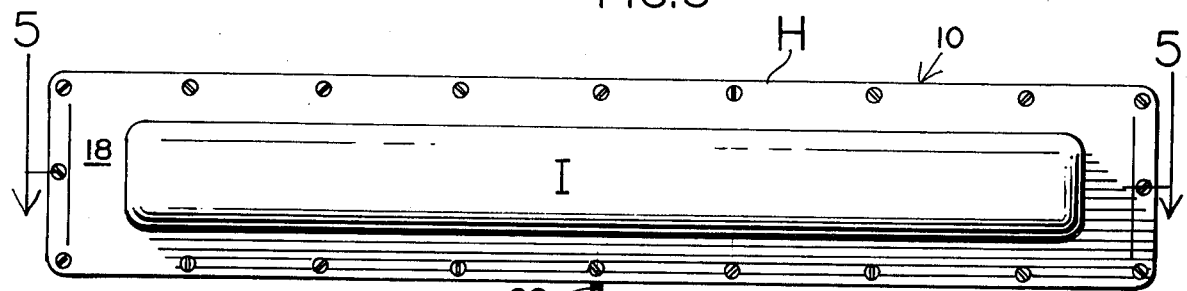
FIG. 4 is a front elevational view.
Figure 5:
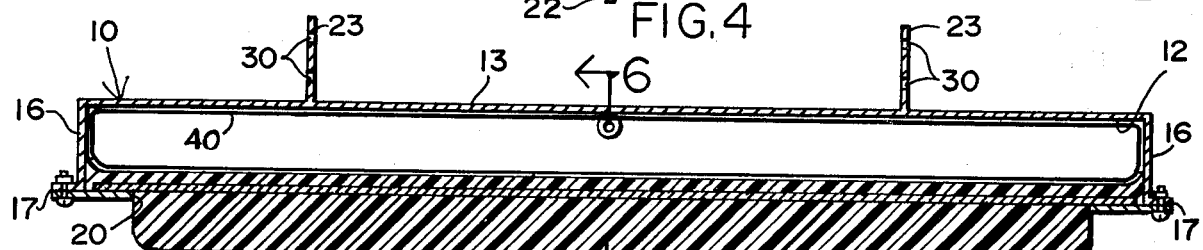
FIG. 5 is a cross sectional view taken along the line 5—5 of FIG. 4.

Referring to the drawing wherein like numerals are used to designate similar parts throughout the several views, the numeral 10 refers to an impact absorbing bumper constructed in accordance with my invention and shown mounted as a front and rear bumper guard on an automobile 11. The impact absorbing bumper 10 comprises generally of a housing H in which there is positioned an inner tube 40 containing air under pressure and an impact absorbing member I is slidably mounted. The housing H shown herein as having a rectangular shape may be of any shape or configuration as long as a pressure chamber 12 is contained therein. The housing H which contains the inner tube 40 and is formed by a rear wall 13 joined along its edge portions by upper and lower side walls 14 and 15 and end walls 16 with flanges 17 extending outwardly of the side and end walls 14, 15 and 16. The front wall 18 of the housing H is provided with a suitable opening 20 through which the impact member I extends and is slidably positioned upon receiving an impact as is explained in detail hereinafter. The front wall 18 is secured to the flanges 17 about its periphery by a plurality of bolts 21 to contain the inner tube in the housing H. Extending through the lower wall 15 is a conventional air valve 22 connected to the inner tube 40 to permit the entry of air under pressure into the inner tube 40 but prevents any air from escaping therethrough. Fastened to the outer surface of the rear wall 13 is a pair of brackets 23 that extend outwardly therefrom and having openings 30 for securing the brackets to the frame of the automobile or to whatever article or structure that is to be protected against impacts.

Figure 7:
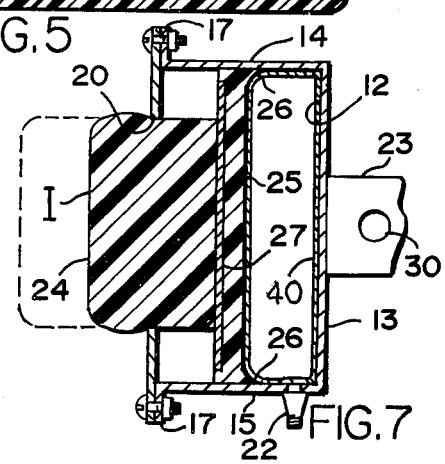
FIG. 7 is a similar view showing the operation of my impact absorbing bumper upon impact.

The impact member I consists of an impact receiving portion 24 extending through and slidably mounted in the opening 20 of the front wall 18 and within the chamber 12 is a substantially flat wall portion 25 that extends to and engages the walls 14, 15 and 16 of the housing H. At the outer edges of the wall portion 25 there extends inwardly of the chamber 12 arcuate toe portions 26 to form an airtight juncture between the wall 25 and walls 14, 15 and 16. Imbedded as by molding in the impact member I is a flexible spring steel plate 27 mounted between impact receiving member 24 and the wall portion 25 to prevent the wall portion 25 from becoming distorted upon an outside force being received on the impact receiving portion 24 and transmitted to the wall portion 25. The flexible plate 27 compels the wall portion 25 to transmit the impact force to the inner tube 40 and its outer edge portions as well as the toe portions 26 to engage the walls 14, 15 and 16 in the same manner as a sliding piston engages the wall of a cylinder. The impact member I is constructed of resilient material such as rubber and the like, whereby upon being impacted, a part of the impact force is absorbed by the impact receiving portion 24 itself because of its resiliency. Also, the impact force directed against the outer face of the impact receiving portion 24 will cause the side walls thereof to bulge outwardly within the opening 20 to engage the inner edges of the wall 18 more firmly and thereby effect an increased resistance to the inward sliding movement of the portion 24. The greatest part of the impact force is absorbed by the air contained in the inner tube 40 that is compressed as the impact member I slides inwardly of the housing H as best shown by FIG. 7.

Figure 6:
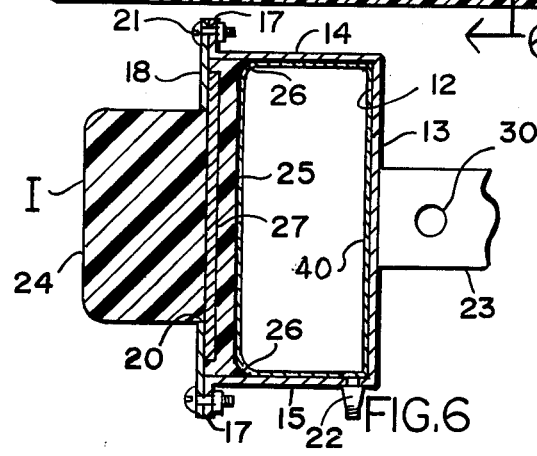
FIG. 6 is a cross sectional view taken along the line 6—6 of FIG. 5.

In the normal use of my impact absorbing bumper 10, air under pressure is taken into the inner tube 40 through the air valve 22 which wall cause the impact member I to slide outwardly of the housing H as shown by FIG. 6. Now when a force is received by impact member I, the greatest part of that force is absorbed by the increased pressure of the air in the inner tube 40 as the impact member slides inwardly of the housing H. Also, the resilient impact receiving portion 24 absorbs a part of that force as does the increased resistance to the sliding movement of the portion 24 along the openings 20 as explained hereinabove.

As indicated herein, my impact absorbing bumper 10 is intended to be used primarily an automobiles, trucks, trailers and the like. However, they can readily be mounted on structures such as docks, platforms, etc. that are subjected to be struck by moving objects such as boats, automobiles, etc. My impact absorbing bumper 10 absorbs a maximum amount of the total force imparted thereon, thereby providing greater safety and ultimate protection to life and property caused by collisions than is available at this time.

What I claim as new and desire to secure by Letters Patent is:

1. An impact absorbing bumper comprising a housing having a front wall, a rear wall, side wall means joining said front and rear walls forming a chamber, said front wall having an opening, substantially resilient impact receiving means extending through said opening, said impact receiving means having an impact receiving portion of substantially the same cross sectional area as said opening positioned outwardly of said front wall to permit the sliding movement of said impact receiving means, a substantially resilient flat wall portion slidably mounted in said chamber and engaging said side wall means, said flat wall portion being substantially larger in cross sectional area than said opening, a plate member mounted in said flat wall portion in said chamber at substantially said opening and between said impact receiving portion and said flat wall portion, a resilient tube positioned in said chamber, said tube having valve means extending through said housing and acting as an inlet for air under pressure into said tube, said tube engaging said side wall means, said rear wall and said resilient flat wall portion whereby impacts received by said resilient impact receiving means is transmitted to said plate member and said resilient flat wall portion to compress said resilient tube as said impact receiving means, said flat wall portion and said plate member are slid inwardly of said chamber and support means secured to said housing for mounting said bumper.

2. The structure as recited by claim 1 taken in combination with a toe portion mounted about a periphery of said flat wall portion, extending inwardly of said chamber and engaging said side wall means for sealing the juncture of said flat wall portion and said side wall means.

* * * * *